G. B. JACKSON.
FRICTION TRANSMISSION FOR MOTOR DRIVEN VEHICLES.
APPLICATION FILED OCT. 23, 1918.
1,327,206.
Patented Jan. 6, 1920.
4 SHEETS—SHEET 1.
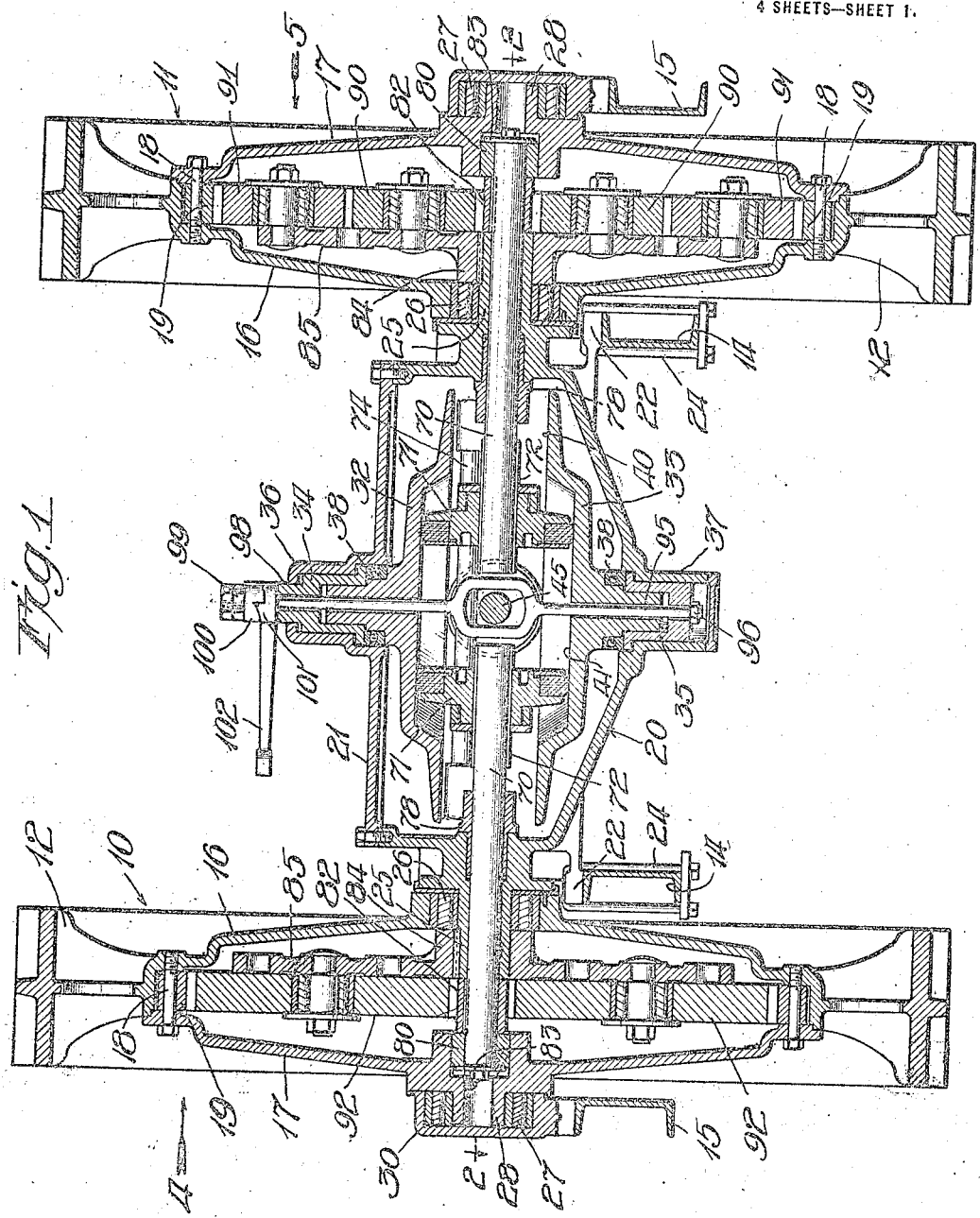
WITNESS
Harry S. Gaither
INVENTOR
George B. Jackson
BY
ATTORNEY

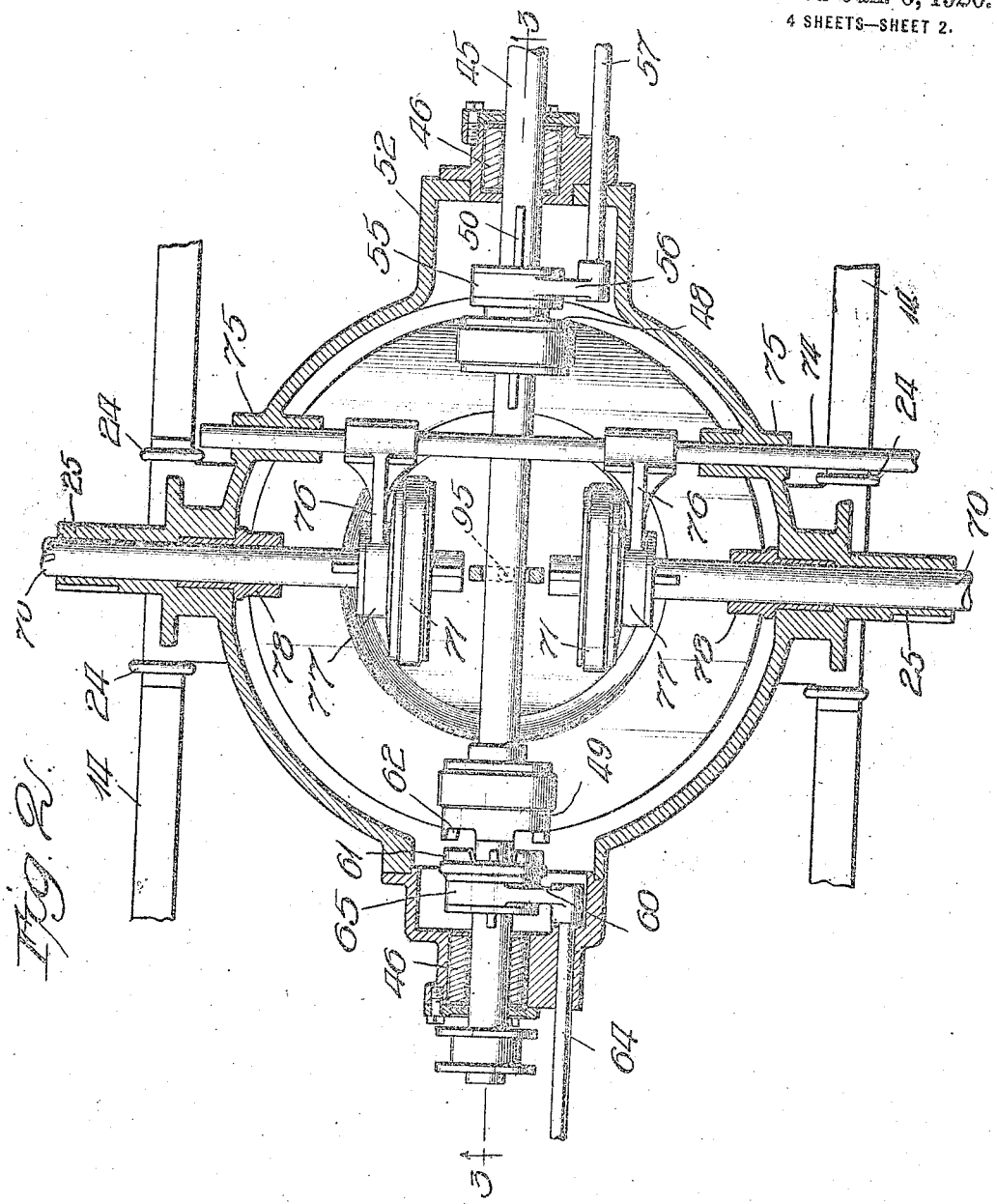

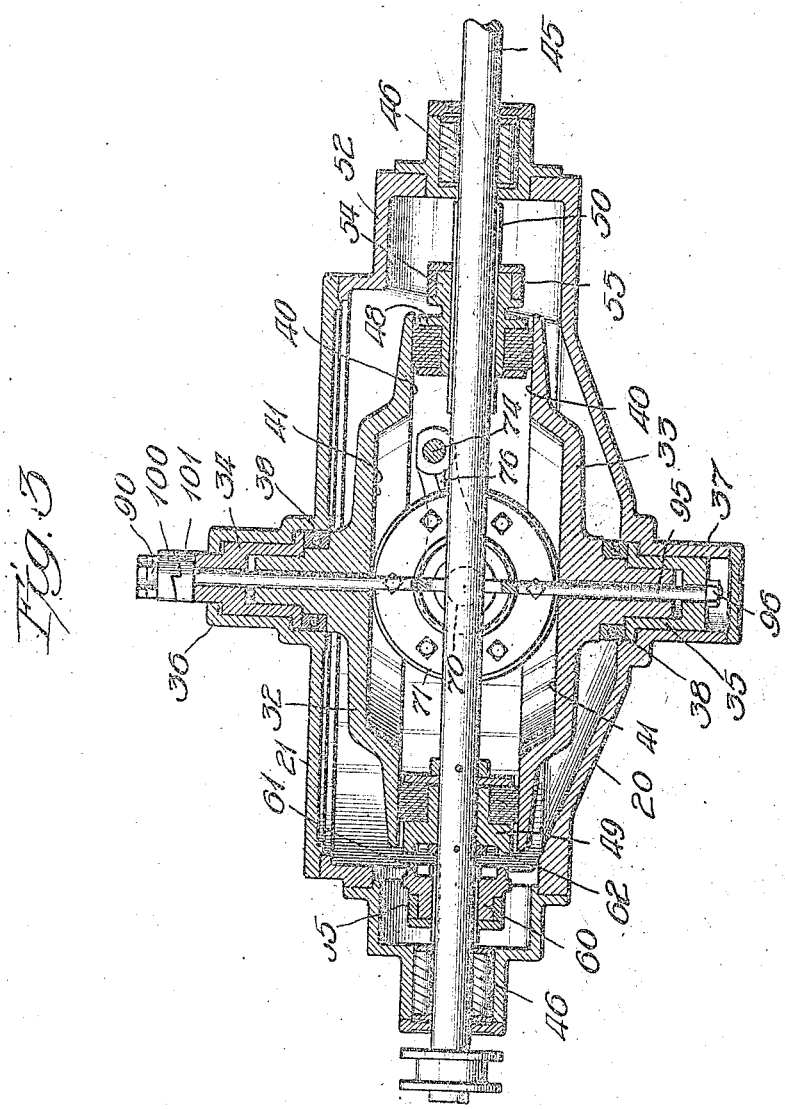

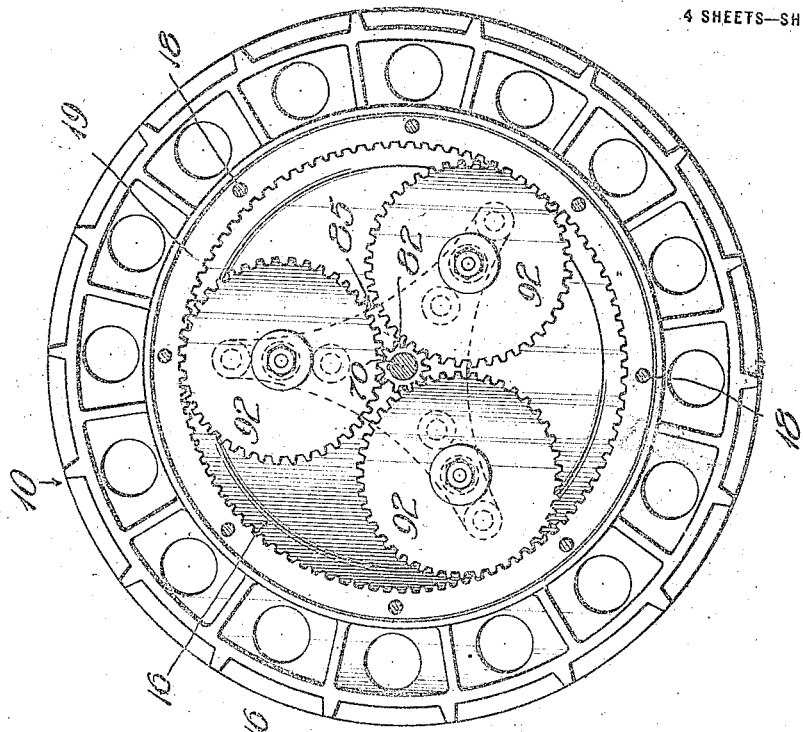
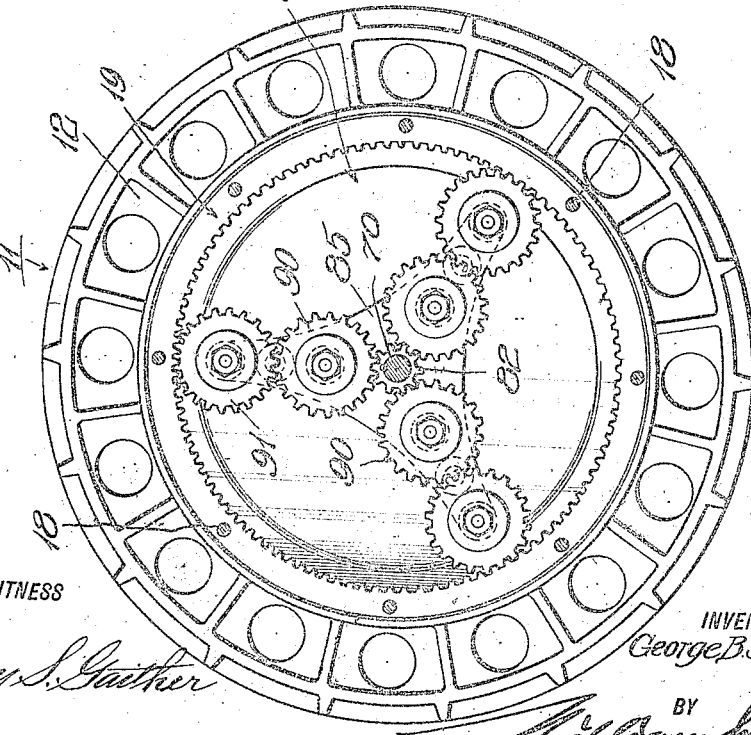

UNITED STATES PATENT OFFICE.

GEORGE B. JACKSON, OF CHICAGO, ILLINOIS.

FRICTION TRANSMISSION FOR MOTOR-DRIVEN VEHICLES.

1,327,206.　　　　Specification of Letters Patent.　　Patented Jan. 6, 1920.

Application filed October 23, 1918. Serial No. 259,339.

*To all whom it may concern:*

Be it known that I, GEORGE B. JACKSON, a citizen of the United States, and a resident of Chicago, in the county of Cook and State of Illinois, have invented certain new and useful Improvements in Friction Transmissions for Motor-Driven Vehicles; and I do hereby declare that the following is a full, clear, and exact description thereof, reference being had to the accompanying drawings, and to the characters of reference marked thereon, which form a part of this specification.

The invention relates to a novel power transmission device for motor driven vehicles for transmitting power from the engine to the traction wheels. It is herein shown as designed for a relatively low-speed vehicle, such as an agricultural tractor, but may be adapted to higher speed vehicles.

One of the objects of the invention is to transmit power from the engine to the wheels without the use of change speed shifting gears, the transmission being effected through friction disks and wheels.

Another object of the invention is to produce a combined transmission and steering gear for motor-driven vehicles through and by which power is transmitted to the steering wheels of the vehicle in a way to drive said wheels and also in a way to steer them.

Another object of the invention is to provide a novel transmission and steering gear of the character described which transmits driving power to the steering wheels without employing the usual differential gear.

Other objects of the invention are to improve and simplify transmission and steering gears for motor-driven vehicles, and the invention consists in the combination and arrangement of the parts shown in the drawings and described in the specification, and is pointed out in the appended claims.

In the drawings,—

Figure 1 is a vertical sectional view of a transmission and steering gear with the steering and driving wheels in section.

Fig. 2 is a horizontal section on the line 2—2 of Fig. 1.

Fig. 3 is a horizontal section on line 3—3 of Fig. 2.

Figs. 4 and 5 are side elevations of the traction wheels and the gearing by which they are connected to the driven shafts of the transmission gear, with the outer plates removed.

As shown in the drawings, 10, 11 designate the driven and steering wheels having like shaped rims 12. The said wheels are made hollow to contain gearing, hereinafter described, and embrace inner integral web members 16, 16 and outer removable web members 17, 17, the latter fixed to the integral structure by screw bolts 18. Between the webs, at their outer peripheries, are located circular racks 19 that are attached to the wheel structure by the bolts 18.

14, 15 designate, respectively, inner and outer channel members of the vehicle frame. The frame at the front of the vehicle comprises further a housing 20 for the transmission and steering mechanism that is provided with a removable cap 21. The housing is provided also with lateral projections 22 that rest on and are supported by the inner channel members 14, and may be secured thereto by the U-bolts 24.

The said housing 20 is provided with oppositely extending tubular bearing studs 25 which support the inner anti-friction bearings 26, 26 of the wheels, or those within the hubs of the integral web members 16. The outer bearings 27 of the wheels are interposed between externally facing bearing studs 28 formed integral with the removable web members 17 and bearing members 30 carried by the outer frame members 15.

32, 33 designate, respectively, upper and lower disks provided with exterior axial bearing studs that extend into closed ended shells 34, 35, seated in axial extensions 36, 37 of the gear housing. Thrust bearings 38 are interposed between the disks and the shells 34, 35. Each of said disks is provided with a central depression which forms on each disk an outer annular bearing face 40 and an inner circular bearing face 41.

45 designates a power or driving shaft adapted to be driven from a suitable motor. It extends through the housing from front to rear thereof and is mounted to rotate in anti-friction bearings 46, 46 carried by the housing 20. 48, 49 designate wheels mounted on the shaft 45 which are adapted to travel in peripheral contact with the higher faces 40 of the disks. The wheel 48 is fixed to the shaft 45 by splines 50, whereby it rotates with, but may slide endwise of said shaft. Thus the friction wheel 48 may be radially adjusted along the faces 40 of the disks to vary the speed of the disks and may also be withdrawn from contact with said faces into a recessed portion 52 of the housing. The actuating means to thus slide the friction wheel on its shaft may consist of a grooved extension of the body of the wheel that is surrounded by a collar 55 provided with a lug 56 to which is fixed one end of a control rod or link 57.

The wheel 49 is normally loose on the shaft, being confined from endwise displacement thereon by collars that are fixed to the shaft.

60 designates a clutch collar that is splined to the shaft 45. It is provided on its inner face with clutch jaws adapted to interact with mating jaws on the body of the friction wheel 49. The clutch is actuated by a control rod or link 64 that is connected at its inner end to a collar 65 which surrounds a grooved portion of the clutch. 70, 70 designate driven shafts disposed in axial alinement with each other and at right angles to the driving shaft 45. 71, 71 designate friction wheels that are fixed to the inner ends of the shafts 70, as by means of splines 72, 72, whereby the wheels may slide endwise of the shafts, but turn therewith. Said friction wheels rotate in contact with the lower or depressed faces 41 of the friction disks 32, 33. Said wheels are adapted to be simultaneously shifted along their shafts by a shifter rod 74 that slides in bearings 75, 75 of the housing and is provided inside the housing with fixed arms 76 which terminate in collars 77 that surround grooved extensions of said wheels 71. The shifter connections for the wheels 71 are such that one wheel is moved toward the centers of the friction faces 41 of the disks when the other wheel 71 is moved away from said centers, and vice versa; and said wheels are spaced a fixed distance apart.

The said shafts 70 are mounted to rotate in bearings 78 carried by the wall of the housing 20 and the shafts extend outwardly beyond said bearings through and beyond the hollow studs 25 of said housing. At their outer ends they extend into bushings 80 set in the hubs of the removable web members 17 of the wheels. Fixed to the outer ends of said shafts, as by keys, are pinions 82. The said pinions are interposed between the tubular studs 25 and the bushings 80 and the shafts are held from endwise displacement between caps 83 removably fixed to the outer ends of the shafts and the hubs 84 of spiders 85 (hereinafter referred to) that are keyed to the tubular studs 25 and bear against the inner bearings 26 of the wheels, which in turn abut against the walls of the housing.

The spiders 85 before referred to, and keyed to the tubular studs 25 of the housing, and, therefore, fixed relatively to the housing, are adapted to support the gearings which connect the pinions 82 to the racks 19 of the wheels. Inasmuch as the disks 32, 33 impart opposite directions of rotation to the shafts 70, the friction wheels of said shafts engaging the disks on opposite sides thereof, it is necessary to so arrange the gearing in the two wheels as to convert the rearward direction of one of the shafts to a forward direction when applied to the circular rack 19 of its associated wheel.

Figs. 4 and 5 illustrate the gear connections between the pinions 82 and the racks 19. In the wheel 11, shown in Fig. 4, intermediate spur gears 90 are interposed between the pinion 82 and the spur gears 91 which mesh directly with the racks. In the wheel 10, shown in Fig. 5, the pinion 82 directly meshes with larger spur gears 92 which in turn directly mesh with the rack 19. Preferably, and as herein shown, the spiders 85 are three-armed spiders, and three sets of gears are employed for transmitting power from the driving shafts to the racks of the wheels. This construction is preferred, inasmuch as it balances the driving stress from the shafts to the wheels. In the adaptation shown in Figs. 4 and 5 the racks 19 are disposed closely adjacent to the tread portions or rims of the wheel, which is adapted for a slow speed vehicle. For higher speed vehicles the racks 19 will be located nearer the centers of the wheels.

The disks 32, 33 are adapted to be forced toward each other and against the friction wheels 48, 49 so as to effect a positive friction connection therebetween. This may be effected in any suitable manner. As herein shown, the means for pressing the disks towards each other comprises a rod 95 which extends centrally through the disks and their axial extensions and through the ends of the shells 34, 35. The rod is looped at its center for the passage of the driving shaft 45. The rod at its lower end is threaded to receive a nut 96 which bears against the bottom of the lower shell 35. The upper end of the rod 95 projects through an extension 98 of the upper shell 34 and is threaded to receive locking nuts 99. Between the upper face of the extension 98 and said nuts 99 are located the two members 100, 101 of a cam, the latter of which is provided with a radial arm 102. The cam member 100 will be fixed to the rod 95 and the faces of the cam members are spirally formed so that by a rotation of the cam member 101, which is loosely mounted on the rod 95, the disks 32, 33 will be pressed together upon the interposed friction wheels. When said cam member 101 is turned in the opposite direction, pressure of the disks on said friction wheel is released.

It will be understood that the controlling device for said arm 102 as well also as the controlling devices for the shifting rods or links 57, 64, and 74 will be extended to a control station convenient to the driver of the vehicle.

The operation of the device is as follows: When the vehicle is to be driven forwardly, the driving shaft 45 is driven by a suitable motor and acts, through the friction wheel 48, to drive the upper and lower disks in opposite directions; the driving power of the friction pulley 48 being transmitted to both said friction disks. The friction disks serve to directly rotate the friction wheels 71, but, by reason of the fact that said friction wheels 71 engage the depressed friction areas 41 of the disks on opposite sides of its center, the shafts 70 are driven in opposite directions, as before stated. The differential rotation of the shafts is, however, corrected by the gearing between the shafts and the racks 19 of the wheels in the manner before described. If the vehicle is to be reversed or driven rearwardly, the disks 32, 33 are momentarily released from their friction wheels and the driving wheel 48 is, through the action of its shifter link 57 shifted along the shaft 45 into the recessed portion 52 of the gear housing, and the friction wheel 49 is locked to the shaft through the action of the clutch 60, and the disks 32, 33 thereafter pressed theragainst. Thus it will be seen that the shaft 45 serves to drive the disks in a direction opposite to that driven through the friction wheel 48.

By simultaneously shifting the friction wheels 71 along their shafts 70, one of said wheels will approach the centers of the friction faces 41 of the disks, while the other will recede therefrom. Thus, it will be observed that the traction and steering wheel adjacent to and associated with the friction wheel 71 nearer the centers of the disks will be rotated more slowly than the other traction and steering wheel, so that the effect of thus shifting the friction wheels 71 is to steer the vehicle from one side to the other of a direct course. When the friction wheels 71 are located at equal distances from the centers of their co-acting friction faces of the disks 32, 33, the vehicle will be driven in a straight or direct path. It will be furthermore observed that driving power is transmitted to the traction and steering wheels without the employment of any differential gear mechanism beyond that embodied in or comprising part of the steering mechanism.

It will be, of course, understood that the friction faces of the different friction wheels will be made of such material and so constructed to adapt them to the particular service to which the transmission and steering mechanism is applied.

The arrangement of the upper and lower disks and interposed driving and transmission gear wheels produces a variable power driving and transmission mechanism, and, as applied to slower moving vehicles, such as agricultural tractors, is effective to transmit high power to the traction and steering wheels. Moreover, the mechanism is very simple, rugged, and compact in construction.

It will be understood, of course, that when the mechanism is applied to higher speed vehicles, the ratios of the gears in the wheels, as well also as the ratios of the friction wheels to the friction disks, and the width of the higher friction faces 40 of said disks will be varied to suit the speed and ranges of the speed required.

I claim as my invention:

1. Friction power transmission mechanism comprising opposed coaxial disks, a friction driving wheel between and engaging friction faces on opposed disks, with means to drive the friction wheel, driven wheels between and engaging other friction faces on said disks, and power transmission shafts separately driven by the driven friction wheels.

2. Friction power transmission mechanism comprising opposed coaxial disks, a friction driving wheel between and engaging friction faces on opposed disks, with means to drive the friction wheel, driven wheels between and engaging other friction faces on said disks at opposite sides of the center of the disks, shafts separately driven by the latter friction wheels, and means to simultaneously and equally shift the driven wheels relatively to the axis of the said disks.

3. Friction power transmission mechanism comprising opposed coaxial disks, a friction driving wheel between and engaging friction faces on opposed disks, with means to drive said wheel, friction driven wheels at opposite sides of the centers of the disks between and engaging other friction faces of said disks, power transmission shafts separately driven by the friction driven wheels, an endwise displaceable shifter member and arms on opposite sides of the axis of the disk fixed to said member and connected to said driven friction wheels in a manner to fixedly space the latter wheels.

4. Friction power transmission mechanism comprising coaxial disks having opposing friction faces, means to rotate said disks in opposite directions, including means to reverse their directions of rotation, driven friction wheels having means to hold them at a fixed distance apart, and engaging said friction faces on opposite sides of the axes of the disks, means to simultaneously shift said wheels toward and from said axes and shafts connected to and separately driven by said wheels.

5. Friction power transmission comprising coaxial rotative friction disks having opposing friction faces, means to rotate said disks in opposite directions, driven friction wheels having means to hold them at a fixed distance apart and engaging said opposed friction surfaces on opposite sides of the axes of said disks, shafts driven by said wheels and on which said wheels are separably mounted to slide endwise thereof, and means to simultaneously displace said driven wheels on said shafts.

6. Friction power transmission mechanism comprising coaxial disks having opposed friction faces, means to rotate said disks in opposite directions, including means to reverse their direction of rotation, driven friction wheels engaging said friction faces on opposite sides of the axes thereof, axially alined driven shafts on which said wheels are non-rotatively mounted and to be axially displaceable thereon, and shifter means for said friction wheels, constructed to maintain them a fixed distance apart.

7. Friction power transmission mechanism comprising coaxial disks having opposed friction faces, driving wheels between and engaging said faces, a power shaft on which said driving wheels are mounted, means to separately control the driving operations of said wheels, whereby the rotation of the disks may be reversed, and driven wheels between and engaging other friction faces of the disks through which power is transmitted from said mechanism.

8. Friction power transmission mechanism comprising coaxial disks having opposed friction faces, driving wheels between and engaging said faces, a power shaft on which said driving wheels are mounted, means to separately control the driving operations of said wheels, whereby the rotation of the disks may be reversed, and driven wheels between and engaging other friction faces of the disks through which power is transmitted from said mechanism, said driven wheels having means to hold them at fixed distances apart and engaging the disks on opposite sides of the axes of the disks and constructed to simultaneously shift said driven wheels relatively to the axes of the disks.

9. Friction power transmission mechanism comprising coaxial disks having opposed friction faces, driving wheels between and engaging said faces, a power shaft extending across the axis of the disks, one of said driving wheels being splined to the shaft and having means to shift it on the shaft radially out of contact with the disks, the other driving wheel being loosely mounted on said power shaft, a clutch splined to said shaft adapted to lock the latter driving wheel to the shaft, and means to transmit power from said disks.

10. Friction power transmission mechanism comprising coaxial disks having opposed friction faces, driving wheels between and engaging said faces, a power shaft on which said driving wheels are mounted, means to separately control the driving operations of said wheels, whereby the rotation of the disks may be reversed, driven wheels between and engaging other friction faces of the disks through which power is transmitted from said mechanism, and means to press said disks toward and against the interposed friction wheels, constructed to release said pressure at will.

11. Friction power transmission mechanism comprising coaxial disks having opposed friction faces, driving wheels between and engaging said faces, a power shaft on which said driving wheels are mounted, means to separately control the driving operations of said wheels, whereby the rotation of the disks may be reversed, and driven wheels between and engaging other friction faces of the disks through which power is transmitted from said mechanism, and means to adjust pressure of the disks against the interposed friction wheels comprising a rod which extends axially through said disks and shouldered to engage exterior bearings associated with said disks, one of said shoulders comprising a member of an adjusting cam.

12. Friction power transmission mechanism comprising coaxial disks, having opposed friction faces, driving wheels between and engaging said faces, a power shaft on which said driving wheels are mounted, means to separately control the driving operations of said wheels, whereby the rotation of the disks may be reversed, driven wheels engaging other friction faces of said disks, axially alined shafts on which the driven wheels are slidably mounted, and means to hold said driven wheels at a fixed distance apart, constructed to permit simultaneous displacement thereof relatively to said axis of the disks.

13. Friction power transmission mechanism comprising coaxial disks having opposed friction faces, driving wheels between and engaging said faces, a power shaft on which said driving wheels are mounted, means to separately control the driving operations of said wheels, whereby the rotation of the disks may be reversed, friction driven wheels between and engaging other friction faces of the disks through which power is transmitted from said mechanism in opposite directions, ultimately driven wheels connected to and driven by the said friction driven wheels, and means connecting said friction driven wheels to the ultimately driven wheels to cause both latter wheels to rotate in the same direction.

14. Friction power transmission mechanism comprising coaxial disks having opposed friction faces, driving wheels between and engaging said faces, a power shaft on which said driving wheels are mounted, means to separately control the driving operations of said wheels, whereby the rotation of the disks may be reversed, friction driven wheels between and engaging other friction faces of the disks, driven shafts on which the latter wheels are mounted and through which power is transmitted from said mechanism in opposite directions, ultimately driven wheels, said driven shafts being provided at their outer ends with pinions, and planetary gears in said alternately driven wheels constructed to give the same direction of rotation to said wheels from the oppositely driven shafts.

15. Friction power transmission comprising coaxial disks having opposed friction faces, driving wheels between and engaging said faces, a power shaft on which said driving wheels are mounted, means to separately control the driving operations of said wheels, whereby the rotation of the disks may be reversed, driven wheels between and engaging other friction faces of the disks on opposite sides of the axes of the disks, shafts on which the latter wheels are mounted, ultimately driven wheels, said driven shafts being provided at their outer ends with pinions, circular racks mounted on said ultimately driven wheels, fixed multi-arm spiders in said latter wheels, and gears mounted on said spiders to operatively connect said pinions to said racks.

16. Friction power transmission mechanism comprising coaxial disks having opposing friction faces, means to rotate said disks in opposite directions, including means to reverse their directions of rotation, and driven friction wheels engaging friction faces of the disks on opposite sides of the axes thereof through which power is transmitted from said mechanism.

In testimony whereof I claim the foregoing as my invention, I hereunto append my signature at Chicago, Illinois, this twelfth day of October, 1918.

GEORGE B. JACKSON.